United States Patent
Domröse et al.

(10) Patent No.: US 11,141,923 B2
(45) Date of Patent: *Oct. 12, 2021

(54) METHOD AND DEVICE OF DETECTING PART QUALITY OF A THREE DIMENSIONAL MANUFACTURING OBJECT

(71) Applicant: EOS GmbH Electro Optical Systems, Krailling (DE)

(72) Inventors: Robert Achim Domröse, Germering (DE); Pilvi Ylander, Turku (FI); Katri Kakko, Turku (FI); Kevin Minet, Turku (FI); Tatu Syvänen, Preitilä (FI); Dominik Wolf, Munich (DE)

(73) Assignee: EOS GmbH Electro Optical Systems, Krailling (DE)

(*) Notice: Subject to any disclaimer, the term of this patent is extended or adjusted under 35 U.S.C. 154(b) by 211 days.

This patent is subject to a terminal disclaimer.

(21) Appl. No.: 16/317,742

(22) PCT Filed: Jul. 7, 2017

(86) PCT No.: PCT/EP2017/067362
§ 371 (c)(1),
(2) Date: Jan. 14, 2019

(87) PCT Pub. No.: WO2018/019567
PCT Pub. Date: Feb. 1, 2018

(65) Prior Publication Data
US 2019/0248078 A1    Aug. 15, 2019

(30) Foreign Application Priority Data
Jul. 25, 2016   (DE) .......................... 102016213609.7

(51) Int. Cl.
*B29C 64/393*    (2017.01)
*B33Y 10/00*    (2015.01)
(Continued)

(52) U.S. Cl.
CPC .......... *B29C 64/393* (2017.08); *B29C 64/153* (2017.08); *B33Y 10/00* (2014.12);
(Continued)

(58) Field of Classification Search
CPC ......... B33Y 10/00; B33Y 50/02; G06F 30/00; G06F 2119/18; Y02P 90/02
(Continued)

(56) References Cited

U.S. PATENT DOCUMENTS

2010/0125356 A1*  5/2010  Shkolnik ................. G06T 5/006
                                                               700/98
2010/0161102 A1    6/2010  Mattes et al.
(Continued)

FOREIGN PATENT DOCUMENTS

DE    102008060046    6/2010
DE    202010010771    1/2012
(Continued)

OTHER PUBLICATIONS

PCT International Search Report for Application No. PCT/EP2017/067362 dated Oct. 17, 2017, 17 pages.
(Continued)

*Primary Examiner* — Md Azad
(74) *Attorney, Agent, or Firm* — Seyfarth Shaw LLP (57) ABSTRACT

Disclosed is a method of determining a quality indicator of an object that has been manufactured by layer-wise additive manufacturing. The method includes providing a first dataset that is assigned to a process monitoring device, detecting a relative frequency of occurrence of a process irregularity in a layer and of assigning a grade indicator value to the solidified object cross-section in a layer according to the detected relative frequency, generating a second dataset, in which a grade indicator value is assigned to the object cross-section in each of said several layers following upon
(Continued)

one another, and determining a quality indicator by using the second dataset (or several further datasets).

19 Claims, 5 Drawing Sheets

(51) Int. Cl.
| | |
|---|---|
| *B33Y 50/02* | (2015.01) |
| *B29C 64/153* | (2017.01) |
| *G05B 19/4099* | (2006.01) |
| *G05B 19/401* | (2006.01) |
| *G06F 30/00* | (2020.01) |
| *G05B 19/418* | (2006.01) |
| *G06F 119/18* | (2020.01) |

(52) U.S. Cl.
CPC ............ *B33Y 50/02* (2014.12); *G05B 19/401* (2013.01); *G05B 19/4099* (2013.01); *G06F 30/00* (2020.01); *G05B 19/4185* (2013.01); *G06F 2119/18* (2020.01); *Y02P 90/02* (2015.11)

(58) Field of Classification Search
USPC ........................................................ 700/109
See application file for complete search history.

(56) References Cited

U.S. PATENT DOCUMENTS

| | | | |
|---|---|---|---|
| 2010/0191360 A1* | 7/2010 | Napadensky | B29C 64/40 700/98 |
| 2013/0168902 A1 | 7/2013 | Herzog et al. | |
| 2013/0314504 A1 | 11/2013 | Zenzinger et al. | |
| 2013/0343947 A1 | 12/2013 | Satzger et al. | |
| 2014/0036455 A1* | 2/2014 | Napadensky | B33Y 50/02 361/748 |
| 2014/0135137 A1 | 5/2014 | Heaven et al. | |
| 2016/0018320 A1 | 1/2016 | Hess et al. | |
| 2016/0054231 A1* | 2/2016 | Hess | G05B 19/41875 702/82 |
| 2016/0184893 A1* | 6/2016 | Dave | B33Y 50/02 419/53 |
| 2018/0215103 A1* | 8/2018 | Herzog | B29C 64/393 |

FOREIGN PATENT DOCUMENTS

| | | |
|---|---|---|
| DE | 102011009624 | 8/2012 |
| DE | 102013003760 | 9/2014 |
| DE | 102013003937 | 9/2014 |
| EP | 2666612 | 11/2013 |

OTHER PUBLICATIONS

Domröse et al., Identification of Process Phenomena in DMLS by Optical In-Process Monitoring, Presentation at Lasers in Manufacturing, EOS Conference, LIM 2015, 13 pages.

Melicki, Christoph, Prozessnahes Qualitatsmanagement beim Lasersintern von Polyamid 12, Dissertation, Universitat Duisburg-Essen, 2014, 139 pages.

Reinhardt et al., Ansatze zur Qualitatsbewertung von generativen Fertigungsverfahren durch die Einfuhrung eines Kennzahlensystems, RTejournal—Forum fur Rapid Technologie, 2012, 9 pages.

Clijsters et al., In situ quality control of the selective laser melding process using a high-speed, real-time melt pool monitoring system, Int.J. Adv. Manuf. Technol., 2014, 13 pages.

Townsend et al., Surface texture metrology for metal additive manufacturing: a review, Precision Engineering, 46, 2016, 14 pages.

\* cited by examiner

METHOD AND DEVICE OF DETECTING
PART QUALITY OF A THREE
DIMENSIONAL MANUFACTURING OBJECT

TECHNICAL FIELD OF THE INVENTION

The present invention refers to a method and a device of detecting the quality of an object manufactured by means of an additive layer-wise manufacturing method, in particular a method and a device of determining a quality indicator for said object.

BACKGROUND OF THE INVENTION

The article "Identification of process phenomena in DMLS by optical in-process monitoring" by R. Domröse and T. Grünberger, a contribution to the conference "Lasers in Manufacturing Conference 2015" describes how metal-based layer-wise additive manufacturing methods (sometimes also named metal-based additive manufacturing methods) can be optically monitored. Specifically, it is about a DMLS (direct metal laser sintering) method, in which a metal powder is melted layer by layer by means of a laser in order to manufacture objects from the metal powder. In particular, process radiation emitted from the molten material, meaning the melt pool, is optically detected and is used as basis for an automatic quality assessment of the process. In the conference contribution it is described how information on an undesired process behavior can be obtained from the process radiation and how process defects can be identified, which process defects lead to a poor quality of the manufactured parts.

The inventors have found that the method described in the article may sometimes lead to the situation that objects are erroneously categorized as being defective or that the categorization is relatively complicated and thus may become demanding.

Therefore, it is an object of the present invention to provide an improved method and a respective device of automatically detecting the quality of an object that has been manufactured by means of a layer-wise additive manufacturing method, which method and device in particular do preferably detect a quality of this object in a more precise way.

The object is achieved by a method of determining a quality indicator according to claim 1, a device of determining a quality indicator according to claim 13, a process monitoring device according to claim 14, a device for manufacturing at least one three-dimensional object according to claim 16 and a computer program according to claim 17. Further developments of the invention are given in the dependent claims. Here, the methods may also be developed further by the features of the devices mentioned further below or mentioned in the respective dependent claims and vice versa. Also, for a further development, the features of the devices may be interchanged.

SUMMARY OF THE INVENTION

An inventive method of determining a quality indicator of an object that has been manufactured by means of a layer-wise additive manufacturing method, wherein in said layer-wise additive manufacturing method the object is manufactured layer by layer by a solidification of a building material at the positions corresponding to the cross-section of the object in a layer, comprises at least the following steps:

a step S1 of providing a first dataset that is assigned to a process monitoring device, wherein in the first dataset for several layers following upon one another during the course of the manufacture, in particular layers following immediately upon one another, a process irregularity information detected by the process monitoring device is assigned to each of a pre-defined number of solidified positions of a layer, a step S2 of detecting for said several layers following upon one another a relative frequency of occurrence of a process irregularity in a layer and of assigning a grade indicator value to the solidified object cross-section in a layer according to the detected relative frequency, wherein to different ranges of values of the relative frequency different grade indicator values indicating different quality levels are assigned and a step S3 of generating a second dataset, in which a grade indicator value is assigned to the object cross-section in each of said several layers following upon one another, and a step S4 of determining a quality indicator by using the second dataset (or several further datasets), said quality indicator indicating the quality of the manufactured object.

According to the invention, a first dataset that is assigned to a process monitoring device and contains process irregularities detected by such process monitoring device is further analyzed. By detecting the relative frequency of occurrence of process irregularities per object cross-section in several layers following upon one another, it can be taken into consideration that in many processes process irregularities occur with a certain frequency, however, need not necessarily lead to severe quality defects of the manufactured objects. Thus, the approach according to the invention leads to more precise results than an approach in which it is for example only detected, how many process irregularities occurred in total in the manufacture of an object. According to the invention it can be taken into consideration that the cumulative occurrence of process irregularities in only a few layers leads to a considerable decrease of part quality. This would not be possible, if only the total number of process irregularities for the object would be taken into consideration. In this respect, a process irregularity may for example be a temporal or spatial variation of the process light (the process radiation), temperature variations within a layer, detected foreign particles, a layer unevenness, etc.

Preferably, said layer-wise additive manufacturing method is a method in which a building material in powder form is solidified by a supply of heat to the positions corresponding to the cross-section of the object in a layer by selectively scanning the layer with energy radiation, and wherein said process irregularity information detected by said process monitoring device indicates whether a process irregularity occurred at a position of the layer when said position was scanned.

A monitoring of the melting process during the selective solidification of the building material (sometimes designated with the term "melt pool monitoring") is particularly suited for providing valuable information on the quality of the manufacturing process of an object. Therefore, advantages of the inventive approach do particularly result when corresponding process monitoring devices are used.

Particularly preferably said relative frequency is detected by determining the area ratio of those positions of an object at which a process irregularity occurred in relation to the total area of the object cross-section. If the determination of the relative frequency of process irregularities is based on the determination of the area ratio of the positions with process irregularities within an object cross-sections, it can be taken into consideration, whether process irregularities within a cross-section are very strongly locally limited or are related to a larger area of an object cross-section, the latter making them more severe. Here, it should be noted that the area ratio of the positions of an object at which a process irregularity occurred in relation to the total area of the object cross-section can be regarded as being equivalent to a temporal proportion of the positions of an object at which a process irregularity occurred in relation to the total time for the manufacture of the object cross-section (as these are substantially linearly interrelated). Accordingly, in the following, "area ratio" is considered as if it were a synonym for "temporal ratio", except the contrary is explicitly stated.

In a preferred modification it is determined whether a position in a layer, to which position a process irregularity has been assigned, is located within a partial object cross-section, preferably a partial object cross-section that is separated from the rest of the object cross-section. If this is the case, the relative frequency of the occurrence of a process irregularity is additionally determined based on the partial object cross-section and a partial grade indicator value is assigned to the partial object cross-section. By the just described modification of the procedure it can be taken into consideration that an accumulation of irregularities in a part of an object cross-section is a strong indication for a defect in the manufactured object at this location, though the relative frequency of irregularities in relation to the total cross-section is not conspicuous.

In particular, also after a detection of the relative frequency by determining the area ratio of those positions of an object at which a process irregularity occurred in relation to the total area of the object cross-section it can be additionally determined, whether a position in a layer, to which position a process irregularity information has been assigned, is located within a partial cross-section and, if this is the case, the relative frequency of the occurrence of a process irregularity can be determined based on the partial object cross-section and a partial grade indicator value $R_i$ can be assigned to said partial object cross-section. In this case, a grade indicator value assigned to the object cross-section in a layer is replaced by a grade indicator value indicating a lower quality, if the partial grade indicator value assigned to the partial object cross-section indicates a lower quality than the grade indicator value assigned to the total object cross-section. Thereby, at particularly critical positions in the manufacture of an object, the object quality can be monitored in addition.

In particular if all layers of an object are subjected to the method according to the invention, more precise statements on the quality of the object are possible.

Preferably, a plurality of quality indicators is determined for a corresponding plurality of objects that have been manufactured together by means of a layer-wise additive manufacturing method. As in a layer-wise additive manufacturing method several objects can be manufactured together in a common building process, preferably for each of the plurality of manufactured objects, in particular for all of them, quality indicators (at least one for each manufactured object) are determined.

In a variation of the method according to the invention, all object cross-sections in a layer are assigned a layer grade indicator value as grade indicator value in the step of detecting a relative frequency of occurrence of a process irregularity. In particular, if there exist several process monitoring devices and datasets that are assigned to them, according to this approach an indicator value can be determined layer-wise. This indicator value takes into consideration the irregularity information supplied by all process monitoring devices. In particular, it is thereby possible to detect whether a deterioration of the part quality is caused by process errors accumulating in certain layers. In particular, the layer grade indicator value can be determined from the grade indicator values assigned to the individual process monitoring devices. Alternatively, simply the relative frequency of process irregularities per layer is detected and a layer grade indicator value is assigned to this relative frequency.

In a preferred variation of the method a plurality of first datasets is provided in step S1, each of which is assigned to a process monitoring device, wherein in step S2 for each dataset a grade indicator value $R_i$ is assigned to each of the object cross-sections in said several layers following upon one another, wherein in step S3 a plurality of second datasets is generated based on the assignments in step S2 and wherein in step S4 in order to determine a quality indicator Q for an object at first a single quality indicator value EQ is determined for each second dataset and a quality indicator value Q is determined based on the single quality indicator values EQ, preferably by adding weighting factors to the single quality indicator values.

By the introduction of weighting factors for the grade indicator values assigned to the individual process monitoring devices, a different significance can be ascribed to the different process monitoring devices when the part quality is assessed. In principle, weighting factors having the same value can be assigned to at least two or to all process monitoring devices.

In a further preferred modification of the method a plurality of first datasets is provided in step S1 of providing a first dataset, wherein each of the first datasets is assigned to a process monitoring device, wherein in step S2 of determining a relative frequency of occurrence of a process irregularity for each dataset a grade indicator value is assigned to each of the object cross-sections in said several layers following upon one another, wherein in step S3 of generating a second dataset a plurality of second datasets is generated based on the assignments in the previous step, wherein in step S4 in order to determine a quality indictor for an object at first a total quality indicator value for an object cross-section in a layer is determined based on the plurality of second datasets, preferably by adding weighting factors to the individual grade indicator values assigned to an object cross-section, and then the quality indicator for the object is determined based on the determined total grade indicator values. By this approach, the information supplied by the individual process monitoring devices per layer can be weighted.

In a preferred approach, a grade indicator value and total grade indicator value, respectively, assigned to an object cross-section in a layer is replaced by a grade indicator value and a total grade indicator value, respectively, if a grade indicator value and a total grade indicator value, respectively, indicating a higher quality is assigned to the object cross-sections belonging to this object in at least n following layers, preferably at least n immediately following layers, wherein n is a pre-defined natural number, for example a user-defined number and/or a number determined based on pre-tests.

By the just described approach it can be taken into consideration that some process irregularities do not lead to process or part defects, but rather are subject to an annealing mechanism. In particular, if in the following layers no process irregularity occurs, this is good evidence that an accumulation of process irregularities in a layer will not have adverse effects on the part quality. This can be taken into consideration by the just described approach. Here, n can be for example a number below 10, e.g. 2, 4, 6 or 8.

In a preferred variation of the method it is derived as follows, whether an object has an acceptable quality:

A grade indicator limit value is set and the grade indicator values and total grade indicator values, respectively, for the object cross-sections of the object in the individual layers are compared to said grade indicator limit value.

The quality of the object is determined to be acceptable only if none of the grade indicator values and total grade indicator values, respectively, is assigned to a lower quality level than the grade indicator limit value.

Due to the introduction of a grade indicator limit value a lower limit for an acceptable part quality can be specified in a simple way. In particular, the grade indicator limit value can be provided specifically for each layer.

In particular, the quality indicator can be an element of a set of quality degree indexes, wherein the cardinality of the set is larger than one and there exists an order relation between the members of the set. Due to the introduction of an ordered set for the quality indicators (for example a range of numbers or a subset of the natural numbers, e.g. numbers 1 to 10), a quality assessment can be made in a particularly simple way. Depending on the area of application of the manufactured object it can be derived whether its quality is sufficient based on the quality indicators. For example, obtaining a relatively low quality indicator (meaning a quality indicator indicating a relatively low quality) for an object may still be sufficient in the field of rapid prototyping, whereas for a serial production of parts for a long-term use it may be necessary to reach a higher quality indicator compared to the first example.

A inventive device of determining a quality indicator of an object that has been manufactured by means of a layer-wise additive manufacturing method, wherein in said layer-wise additive manufacturing method the object is manufactured layer by layer by a solidification of a building material at the positions corresponding to the cross-section of the object in a layer, comprises at least the following:

a provision unit of providing a first dataset that is assigned to a process monitoring device, wherein in the first dataset for several layers following upon one another, in particular layers following immediately upon one another, a process irregularity information detected by the process monitoring device that is assigned to the dataset is assigned to each of a pre-defined number of solidified positions of a layer, a detection unit, which, when in operation, detects for said several layers following upon one another a relative frequency of occurrence of a process irregularity in a layer and assigns a grade indicator value to the solidified object cross-section in a layer according to the detected relative frequency, wherein to different ranges of values of the relative frequency different grade indicator values indicating different quality levels are assigned and a generation unit, which, when in operation, generates a second dataset, in which a grade indicator value is assigned to the object cross-section in each of said several layers following upon one another, and a determination unit of determining a quality indicator by using the second dataset, said quality indicator indicating the quality of the manufactured object.

The device for determining a quality indicator can for example be implemented by means of a computer dedicated to this purpose or it may be only a computer program. The computer program can for example run on a computing device that is spatially separated from the layer-wise additive manufacturing device.

A preferred inventive process monitoring device for detecting the occurrence of process irregularities in a layer-wise additive manufacturing method, wherein in said layer-wise additive manufacturing method the objects are manufactured layer by layer by a solidification of a building material at the positions corresponding to the cross-section of an object in a layer, comprises an inventive device of determining a quality indicator and further comprises:

an irregularity detection unit, which, for each of a pre-defined number of positions of a layer that have been scanned with energy radiation, does an irregularity detection of the occurrence of a process irregularity concerning at least one process parameter in the manufacture and a process irregularity documentation unit that generates a first dataset, in which, for several layers following upon one another, in particular all layers, a process irregularity information is assigned to each of a pre-defined number of solidified positions of a layer that have been scanned with the energy radiation, said process irregularity information indicating, whether at that position a process irregularity occurred during the solidification of the building material.

Thus, the device for determining a quality indicator can in particular be integrated into a process monitoring device. In particular, for the case that several process monitoring devices exist, each of the process monitoring devices can already provide a grade indicator value per layer and/or object cross-section.

Preferably, said irregularity detection unit is a (e.g. camera-based or imaging) layer monitoring unit and/or a photodiode-based melt pool monitoring unit and/or an optical tomography unit. As such units, in particular devices for melt pool monitoring, are able to provide important information on the part quality, the present invention is of particular advantage in connection with such process monitoring devices for a melt pool monitoring or optical tomography units.

An inventive device of manufacturing at least one three-dimensional object by means of a layer-wise additive manufacturing method, wherein in said layer-wise additive manufacturing method the objects are manufactured layer by layer by a solidification of a building material at the positions corresponding to the cross-section of the object in a layer comprises:

a scanning unit for scanning positions of an applied layer of the building material that correspond to the cross-section of the object by means of an energy radiation in order to selectively solidify the building material, an inventive device of determining a quality indicator and/or an inventive process monitoring device.

An inventive computer program is loadable into a programmable control unit and/or device and has program code means implementing all steps of an inventive method of determining a quality indicator when the computer program is executed.

BRIEF DESCRIPTION OF THE DRAWINGS

Further features and expediences of the invention will arise from the description of embodiments based on the enclosed drawings.

DETAILED DESCRIPTION OF THE EMBODIMENTS

In the following, for a description of the method according to the invention, at first a layer-wise additive manufacturing device according to the invention shall be described using a laser sintering or melting device as example by making reference to FIG. 1. At this point it shall be remarked that in the present application the term "a number of" is always to be understood as meaning "one or more".

For the construction of an object 2, the laser sintering or melting device 1 comprises a process chamber or building chamber 3 having a chamber wall 4.

A container 5 open to the top having a container wall 6 is arranged in the process chamber 3. A working plane 7 is defined by the upper opening of the container 5, wherein that area of the working plane 7 that is located within the opening and can be used for the construction of the object 2, is designated as build area 8.

A support 10 that can be moved in a vertical direction V is arranged in the container 5. A base plate 11 is attached to the support 10, which base plate 11 closes the container 5 at the bottom and thus forms its bottom. The base plate 11 can be a plate that has been formed separately from the support 10 and is fixed to the carrier support 10 or it can be integrally formed with the support 10. Depending on the powder that is used and on the process, a construction platform 12 as construction base can be attached to the base plate 11, on which construction platform 12 the object 2 will be constructed. However, the object 2 can also be built on the base plate 11 itself which then serves as construction base. In FIG. 1, the object 2 to be formed in the container 5 on the construction platform 12 is shown below the working plane 7 in an intermediate state with several solidified layers surrounded by building material 13 that remained unsolidified.

The laser sintering device 1 further comprises a storage container 14 for a building material 15 in powder form that can be solidified by means of electromagnetic radiation and a recoater 16 that can be moved in a horizontal direction H for applying the building material 15 within the build area 8. Optionally, a radiant heater 17 is arranged in the process chamber 3, which serves for heating the applied building material 15. As radiant heater 17 an infrared radiator can be provided, for example.

The laser sintering device 1 further comprises an exposure device 20 having a laser 21 that generates a laser beam 22 which is deflected by means of a deflection device 23 and is focused onto the working plane 7 by means of a focusing device 24 through a coupling window 25 arranged at the top side of the process chamber 3 in the chamber wall 4.

Furthermore, the laser sintering device 1 comprises a control unit 29 by which the individual components of the device 1 can be controlled in a coordinated manner in order to carry out the construction process. Alternatively, the control unit can also be arranged in part or completely outside of the device. The control unit can comprise a CPU, the operation of which is controlled by a computer program (software). The computer program can be stored separately from the device on a storage medium from which it can be loaded into the device, in particular into the control unit.

The control unit 29 is controlled via a control command set that a.o. comprises data that include the structure of the number of objects to be manufactured, in particular a three-dimensional CAD layer model of the objects with information on the respective cross-section of an object in each layer of building material to be solidified and data specifying the exact parameters in the solidification of the building material. In particular, the data contain exact information on each layer to be solidified in the manufacture of the number of objects. How a control command set looks like in detail, is sufficiently described in the prior art and therefore it is not explained here further as this is not an integral part of the present invention.

In operation, the support 10 is lowered layer by layer by means of the control device 29, the recoater 16 is controlled such that a new powder layer is applied and the deflection device 23 and, if necessary, also the laser 21 and/or the focusing device 24 are controlled such that the respective layer is solidified at the positions corresponding to the respective object by means of the laser by scanning these positions with the laser.

Figure 1:
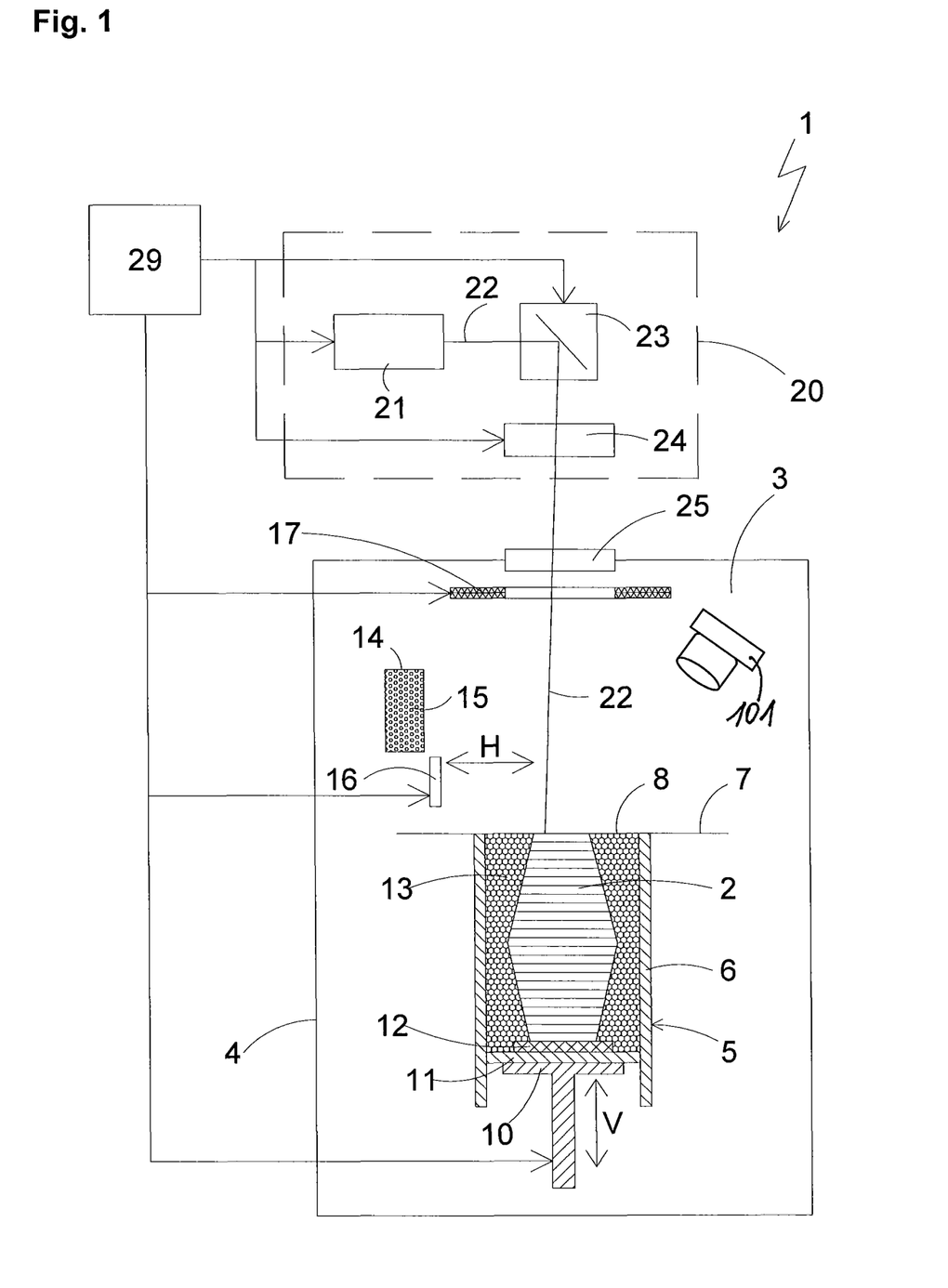
FIG. 1 is a schematic, partially cross-sectional view of a device for an additive manufacturing of a three-dimensional object according to an embodiment of the invention.

FIG. 1 further shows a process monitoring device 101, which is shown inside of the process chamber 3 and thus as part of the laser sintering device 1, however, may well be arranged outside of the process chamber 3. The process monitoring device 101 is a device of detecting the process behavior during the construction of objects by means of the layer-wise additive manufacturing device. For example, the process monitoring device 101 may serve for a monitoring of the condition during the solidification of the building material with the laser beam. In such a case it comprises a sensor that is suitable to detect the process radiation emitted from the point of incidence of the laser beam onto the building material. For example, the sensor can be implemented as optical camera or as photodiode. Based on the intensity of the recorded process light (the process radiation) or else based on the analysis of the temporal behavior of the signal, which behavior is induced in the sensor by the process radiation, conclusions can be drawn on irregularities of the solidification process. When using a camera instead of a photodiode, a two-dimensional information can be additionally obtained.

Apart from the melt pool monitoring device mentioned above as example, also other process monitoring devices are known that can be used alternatively or in addition to the melt pool monitoring device, e.g. camera-based layer monitoring devices that are able to detect irregularities in layer application or else devices that analyze the layer surface after the solidification process. Examples of process irregularities that can be detected by means of the process monitoring devices are in particular the following:

The occurrence and increased (augmented) occurrence, respectively, of particles like splashes, smoke, vapors, etc.;

temporal or spatial variations of the emission of radiation from the location at which the radiation acts on the building material, which variations allow for example for conclusions on overheatings of the building material, in particular if a spectral analysis of the process radiation (for example also an indirect spectral analysis such as by means of a sensor for several wavelengths like a multi-color sensor) is additionally carried out;

a large surface roughness of an already solidified region within a layer;

further measurement and prediction results, respectively, that suggest an increased probability of defects in the microstructure of the material of the manufactured object.

In which way one can draw conclusions on process irregularities based on sensor information is already known to the skilled person and is not an object of the present invention.

Figure 2:
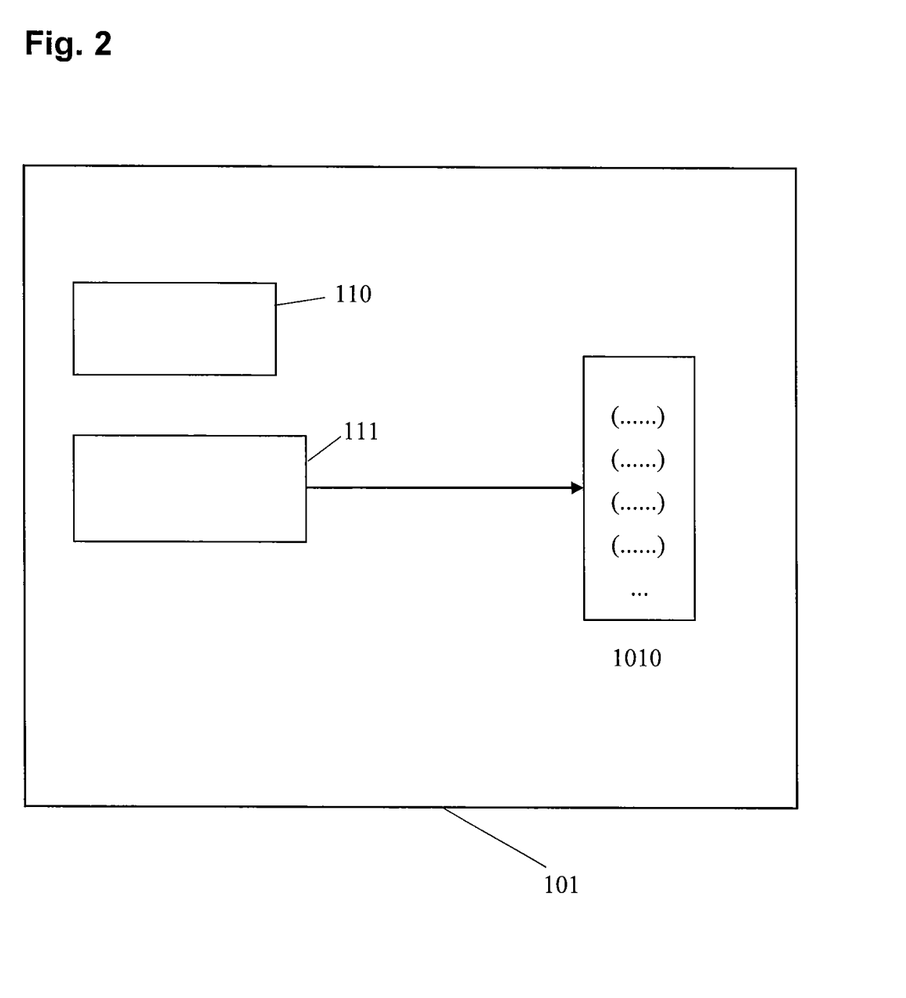
FIG. 2 is a diagram, which schematically shows the setup of a process monitoring device that can be used in connection with the invention.

An exemplary setup of a process monitoring device 101 that can be used in connection with the invention is illustrated in FIG. 2. In particular, the process monitoring device 101 comprises an irregularity detection unit 110 by means of which it is determined for a number of positions of a layer, whether there exists an irregularity in the process flow. For example, in the case of a melt pool monitoring device the irregularity detection unit 110 would comprise for example the sensor together with a following processing hardware and software for the sensor information in order to derive an information, whether an irregularity occurred.

Furthermore, the process monitoring device comprises a process irregularity documentation unit 111 that generates a first dataset 1010, in which dataset, for several layers following upon each other, a process irregularity information is stored for a number of positions of each layer, said process irregularity information indicating whether a process irregularity occurred at the corresponding position, e.g. during the solidification of the building material. An entry in such a first dataset 1010 that refers to a layer i during the manufacturing process of the object can for example have the following contents:

$(x_j, y_j, O_k, I, \ldots, i)$

In the above entry, the designator $O_k$ expresses the fact that the entry refers to the object k, because in a layer-wise additive manufacturing method several objects can be manufactured simultaneously and thus there may also be several object cross-sections within a layer to be solidified. The coordinates $x_j$ and $y_j$ designate the position of a layer for which the irregularity information is stored. Finally, the parameter I represents the process irregularity information. The parameter I may be an index number expressing the severity of a process irregularity (for example a natural number between 1 and 10) or it may also be only a binary information (0 and 1). For example, a 1 would indicate that at the position $x_j$, $y_j$ in the object cross-section related to the object k in the layer i a process irregularity occurred. Each of the positions at which no process irregularity was detected could have the value 0 for the irregularity designator I.

The first dataset 101 can either be stored in a storage in the process monitoring device 101, as shown in FIG. 2, wherein the storage may also be in the process irregularity documentation unit 111 itself, or it may be output to a storage device outside of the process monitoring device 101, with which the process monitoring device 101 is connected in terms of signaling.

Figure 3:
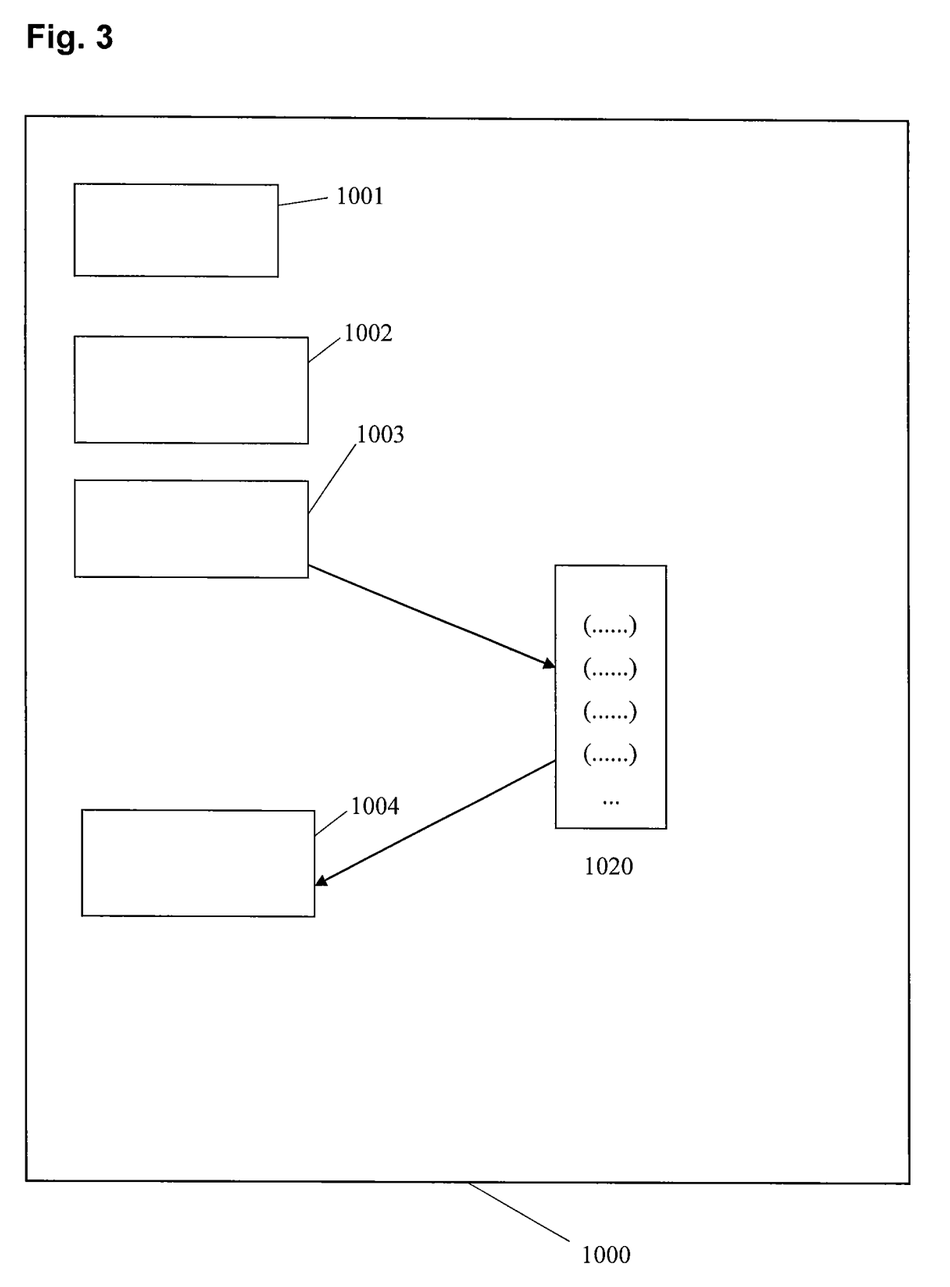
FIG. 3 is a diagram schematically illustrating the setup of an inventive device of determining a quality indicator.
Figure 4:
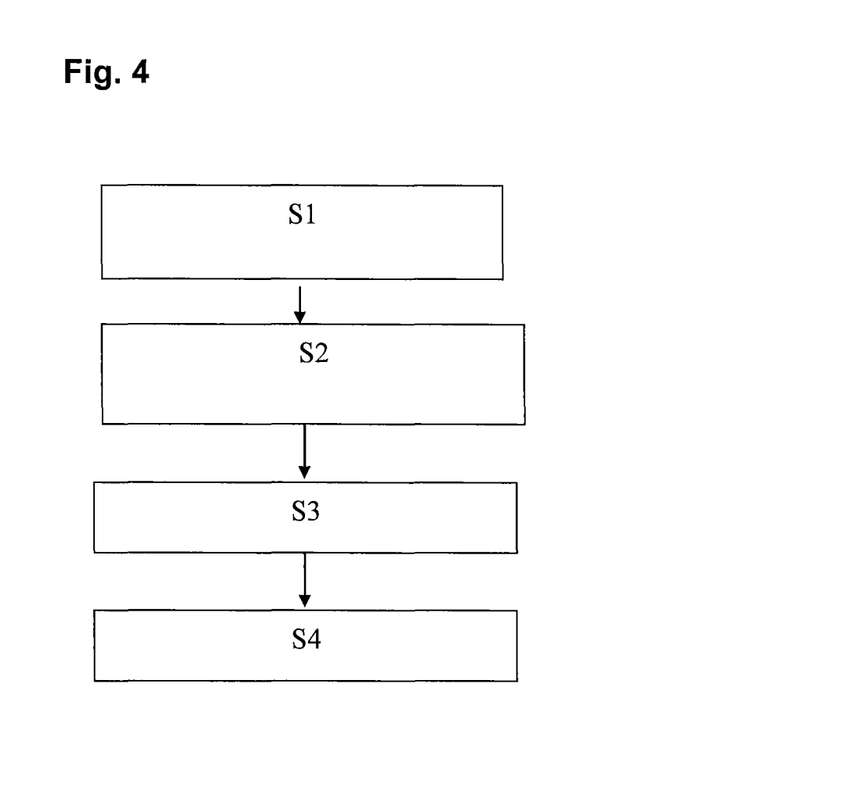
FIG. 4 is a diagram schematically illustrating the steps of the inventive method of determining a quality indicator.

FIG. 3 shows schematically the setup of an inventive device 1000 of determining a quality indicator Q of an object manufactured by means of a laser-wise additive manufacturing method. FIG. 4 shows the sequence of an inventive method of determining a quality indicator Q, which method can for example be carried out by means of the device 1000 from FIG. 3.

The device 1000 comprises a provision unit 1001 of providing (step S1) a number of first datasets 1010, each of which is assigned to one of a respective number of process monitoring devices 101. In other words, the provision unit 1001 receives from a number of process monitoring devices 101 the first datasets 1010 generated by the process irregularity documentation units 111 of the same. The number of process monitoring devices 101 can be only a single process monitoring device or else a plurality of process monitoring devices which preferably are different from each other, however, need not necessarily be different from each other. For receiving the number of first datasets 1010, the device 1000 need not necessarily be connected to the respective process monitoring devices 101. Rather, the first datasets can also be stored in a storage that is separated from the process monitoring devices 101 and/or from the device 1000. However, in each case the provision unit 1001 makes accessible the contents of the first datasets to the other components of the device 1000.

Furthermore, the device 1000 comprises a detection unit 1002 by means of which the process step S2 of the inventive method that is shown in FIG. 4 can be implemented. In particular, the detection unit 1002 detects a relative frequency of occurrence of a process irregularity within the object cross-section of an object in each of the number of layers following upon each other, preferably for the cross-sections of several, in particular all, objects in these layers. Subsequently, the detection unit 1002 assigns a grade indicator value $R_i$ to the object cross-sections in the layers in accordance with the relative frequencies detected for the same.

The relative frequency can for example be detected by determining the area ratio of the positions at which a process irregularity is indicated in the first dataset 1010 with respect to the total area of an object cross-section. Alternatively, the number of positions within an object cross-section at which a process irregularity occurred may be compared to the total number of positions in the first dataset 1010 that exist within an object cross-section. Advantageously, the grade indicator value $R_i$ is a natural number (for example a number between 1 and 10). For example, a grade indicator value $R_i$ may be assigned to a value of the relative frequency per layer and object cross-section as follows:

| relative frequency of irregularities | grade indicator value $R_i$ |
|---|---|
| 0-2% | 1 |
| 2-5% | 2 |
| 5-10% | 3 |
| 10-15% | 4 |
| 15-25% | 5 |
| etc. | |

It can be seen that in the above table there is a non-linear assignment of ranges of relative frequencies to grade indicator values R. In other words, when the value for the relative frequency rises, a larger range of percentages is assigned to a specific grade indicator value $R_i$ than for lower values of the relative frequencies. This need not be so, however, such a non-linear assignment has the advantage that in particular a quality range that is of interest can be resolved into fine details. If a process quality is bad, it does not matter for example, whether the quality was "very bad" or "particularly bad".

Finally, a generation unit 1003 generates for each of the number of first datasets 1010 a corresponding second dataset 1020, in which in each of the layers a grade indicator value $R_i$ is assigned to an object cross-section (step S3 in FIG. 4). An entry in such a second dataset 1020 that refers to a layer i during the manufacturing process of an object can have for example the following contents:

$$(O_k, R_i, m_i)$$

The designator $O_k$ in the above entry expresses the fact that the entry refers to the object k as in a layer-wise additive manufacturing method several objects may be manufactured simultaneously and thus there may exist also several object cross-sections within a layer to be solidified. The designator $m_i$ characterizes the affiliation of this entry (like the whole second dataset) with the process monitoring device m. Thus, for each process monitoring device 101 there exists a second dataset 1020, in which a grade indicator value $R_i$ is assigned to an object cross-section in each of the layers. Such grade indicator value $R_i$ represents the frequency of process irregularities furnished by the process monitoring device for the object cross-section in this layer. For reasons of simplicity, FIG. 3 only shows one second dataset 1020.

Finally, the device for determining a quality indicator Q further comprises a quality indicator determination unit 1004 that determines a quality indicator value for a manufactured object, preferably for several objects, in particular for each of the objects manufactured in parallel in one manufacturing process based on the data in the second datasets 1020 meaning the grade indicator values $R_i$ assigned to the individual layers and object cross-sections in these datasets (step S4 in FIG. 4).

In the following, different possible approaches are described as examples how a quality indicator value for an object can be obtained based on the second datasets 1020. Here, the following description at first is limited to the case, in which only one second dataset 1020 is present due to the resulting simpler explanation:

In the following examples it is furthermore assumed that a grade indicator value $R_i$ is a natural number between 1 and an upper limit (such as 10). Of course, also the number "0" could be a possible grade indicator value.

An action of the quality indicator determination unit 1004 could for example look like as follows: in a second dataset 1020 each grade indicator value $R_i$ for an object (thus all grade indicator values for object cross-sections of this object in the layers of the second dataset) is compared to a grade indicator limit value Z. This grade indicator limit value Z is for example that grade indicator value, for which when being exceeded or undercut the quality of the corresponding object cross-section is considered to be no longer acceptable.

The choice of the value of a quality indicator Q (which is for example also a natural number out of a limited set, e.g. the numbers 1 to 6) now could be made dependent on how often or whether the grade indicator limit value Z for an object is exceeded and undercut, respectively. For example, when the grade indicator limit value Z is exceeded and undercut, respectively, by grade indicator values $R_i$, the maximum and minimum, respectively, grade indicator value $R_i$ could be determined as quality indicator value Q. If there are no exceedances or (in particular) undercuts of the grade indicator limit value Z, e.g. the mean value<$R_i$> of all grade indicator values could simply be chosen as quality indicator value Q.

For a simpler explanation it is assumed from now on that higher grade indicator values indicate to more frequent process irregularities (thus a worse quality).

By the inventive detection of grade indicator values per object cross-section in a layer it becomes possible to detect an insufficient part quality that is caused by one or several object cross-sections having a particularly bad quality in a particularly simple way. Namely, in an approach, in which the part quality was inferred merely based on the total number of process irregularities, one (single) particularly "bad" layer could not be sufficiently taken into consideration.

In particular, also only the values 0 and 1 could be admitted for the quality indicator Q and a value of 1 could be assigned to the quality indicator only if none of the grade indicator values for an object exceeds the grade indicator limit value Z. Here, many possibilities for a variation exist without departing from the idea of the invention.

Optionally, if only the values 0 and 1 for the quality indicator are admitted, an acceptance indicator A can be additionally introduced, which acceptance indicator can only adopt the values 1 (acceptable object quality) and 0 (inacceptable object quality). Then, the value of the acceptance indicator A can be determined depending on the value of the quality indicator.

Though the above approach already leads to a more precise detection of defect objects, it is possible to modify it such that more precise statements on the quality of a manufactured object can be made. The inventors have found that there exist annealing mechanisms during the manufacturing process. For example, in case an irregularity occurs in a larger percentage of the area of an object cross-section, this is at first a problem as material defects (binding defects, fused-in splashes or pores) may be inferred from that. However, such a material defect can be annealed by the exposure of following layers. The reason is that already solidified layers are again (partially) melted in the exposure of the layer lying above. However, a precondition for an annealing is that in the layers lying above process irregularities do not occur excessively. Thus, even if an accumulation of process irregularities occurred to a large extent in a layer, the part may nevertheless have a good quality due to the annealing mechanism. Accordingly, for determining the quality indicator Q, grade indicator values of a layer of an object in the second dataset 1020 may be replaced by grade indicator values indicating a higher quality, if in at least n layers following that layer there are grade indicator values indicating a higher quality. Here, n may be any natural number between 1 and for example 10, e.g. 3, 5, 8, etc. In particular, an upgrade of grade indicator values (in the above example this would correspond to a lowering of grade indicator values $R_i$) may be done only for those layers, in which there exists a grade indicator value in the second dataset 1020 that exceeds a pre-defined grade indicator limit value Z. By such an approach the number of manufactured objects that have been wrongly classified as "inferior" can be reduced.

Figure 5:
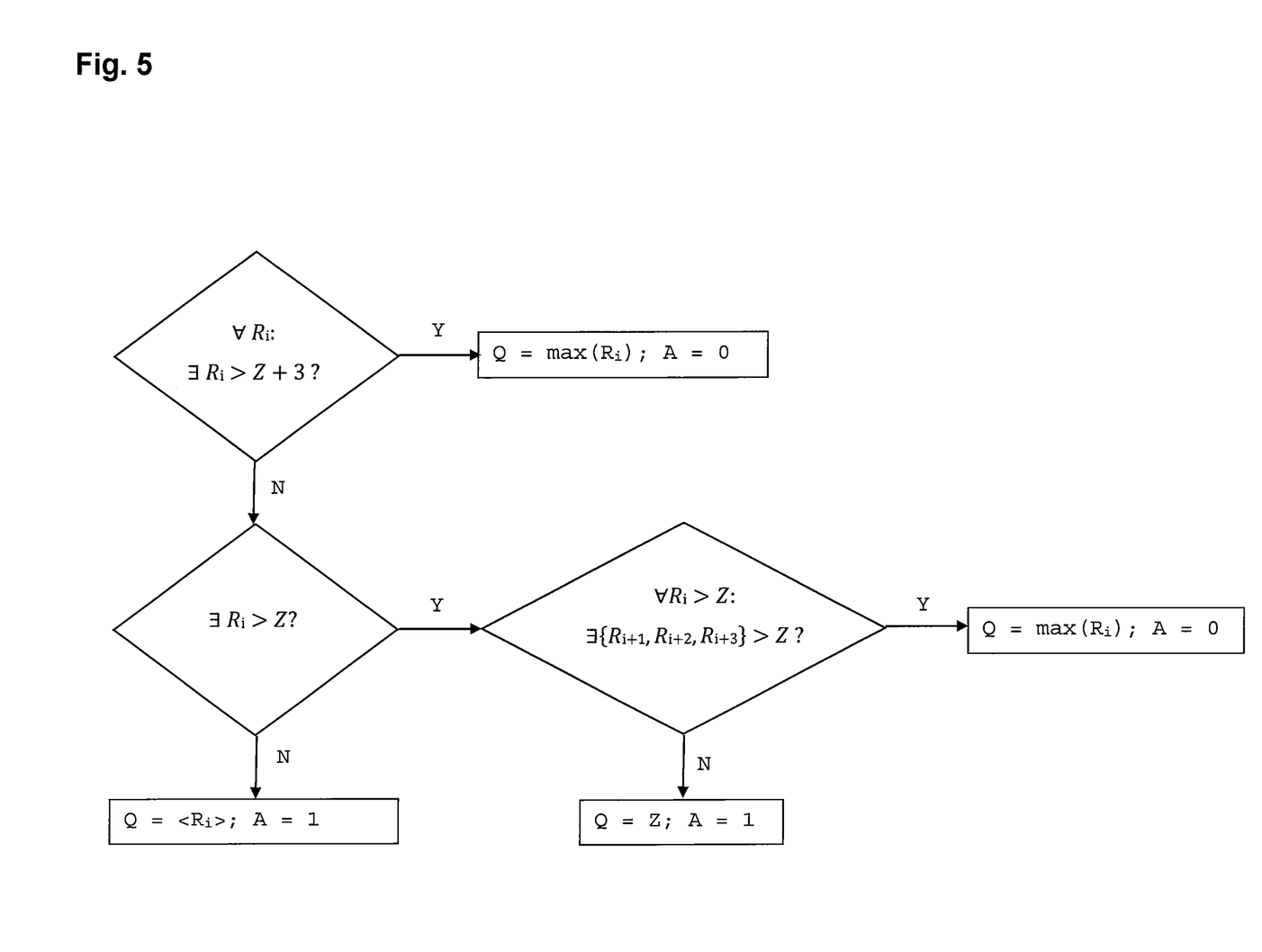
FIG. 5 is a process flow diagram showing an exemplary algorithm for implementing the inventive method.

The sequence of an exemplary algorithm for the just described approach will be described in the following with reference to FIG. 5:

In the following, $R_i$ shall designate a grade indicator value that exists per layer and object cross-section in the second dataset 1020 and Q shall designate a value of the quality indicator. Furthermore, "Y" shall indicate that a checked condition is existent and "N" shall indicate that a checked condition is not existent. Now, according to the exemplary algorithm the procedure is as follows:

At first, for each grade indicator value $R_i$ that exists in the second dataset 1020 it is tested, whether such grade indicator value $R_i$ satisfies the condition $R_i > Z+3$. If this is the case for one or more grade indicator values, the maximum value of the grade indicator values $R_i$ satisfying the condition is assigned to the quality indicator Q, the value 0 is assigned to the acceptance indicator (indicating a non-acceptable quality) and the algorithm stops. Thus, in the present example a grade indicator value $R_i$ that exceeds the grade indicator limit value Z by more than three evaluation levels is taken as indication that the process irregularity in the corresponding layer was so severe that the resulting part defect is not annealable and that the part as a whole has a low quality, which is expressed by a quality indicator value that has the same value as the worst grade indicator value R. It shall be remarked that the above expression "Z+3" is only mentioned as an example. Of course, one could have also chosen the term to be "Z+2", "Z+4", etc. or another immediate stop criterion due to lack of quality could have been chosen.

If, continuing with the example, the condition $R_i>Z+3$ is satisfied for none of the grade indicator values, it is tested, whether there exist one or more grade indicator values $R_i$; in the second dataset 1020 that exceed the grade indicator limit value Z. If this is not the case, the mean value of all grade indicator values $R_i$; existing in the second dataset is assigned to the quality indicator Q as value ($Q=<R_i>$). Moreover, the value 1 is assigned to the acceptance indicator A (indicating to an acceptable quality) and the algorithm stops. If only integer values should be admitted for the quality indicator Q, the mean value is rounded before it is assigned to the quality indicator Q (not shown in FIG. 5).

If grade indicator values $R_i$; exist that exceed the grade indicator limit value Z, it is checked for each of these grade indicator values, whether possibly an annealing process took place in the following layers. This means it is checked for each of these grade indicator values $R_i$, whether the grade indicator values $R_i+1$, $R_i+2$, $R_i+3$ do also exceed the grade indicator limit value Z. (In this example the check is made for each of the following three layers. However, the check could also be made for a different number of following layers, e.g. two or four, etc. layers.) If in none of these following layers the corresponding grade indicator values exceed the grade indicator limit value Z, it is assumed that the deficient process quality in layer i has been annealed. Then, the value of the grade indicator limit value Z is assigned to the quality indicator Q, the value 1 is assigned to the acceptance indicator A (indicating an acceptable quality) and the algorithm stops. Though an annealing was assumed, it is still assumed that the part does not have a particularly good part quality, wherein in such a case the quality indicator Q may, generally spoken, not be "better" than the grade indicator limit value Z.

If there exist grade indicator values $R_i$ exceeding the grade indicator limit value Z, for which no annealing can be detected in the following layers, the maximum value of these grade indicator values $R_i$ is assigned to the quality indicator Q as value, the value 0 is assigned to the acceptance indicator (indicating a non-acceptable quality) and the algorithm stops. It shall be remarked that in FIG. 5 the expression "max ($R_i$)" at the corresponding position in the diagram is not the maximum of all grade indicator values $R_i$ but only the maximum of those for which no annealing could be detected.

Of course, different modifications of the above presented example are possible. However, one recognizes that the present approach goes beyond a simple determination of an average of the grade indicator values and makes a more reliable assignment of quality indicators to parts possible.

At first, the above described method only determines a quality indicator value for an object. Then, from what point on an object is regarded as object with acceptable quality, simply depends on the limit value for the acceptance of an object within the range of values for the quality indicator.

An advantage of the present invention is in particular the fact that for determining a quality indictor value indicating the part quality all second datasets 1020 each of which is assigned to a process monitoring device, are taken into consideration. Based on different process monitoring systems an overall assessment of the process quality in the manufacturing of an object is obtained. In particular, it is possible to determine at first a single quality indicator value EQ for each second dataset 1020 separately and then determine a quality indicator value Q (for the total quality) on the basis of these individually determined single quality indicator values. Here, for a determination of the quality indicator value Q weighting factors can be attributed to the single quality indicator values EQ, whereby such single quality indicator values EQ are considered to a different extent for the determination of the quality indicator value Q. Alternatively, it is of course also possible to determine at first a total grade indicator value per object and layer taking into consideration all existing second datasets 1020. In the latter case a quality indicator value Q would be determined from the total grade indicator values detected per layer and object.

Furthermore, a particular advantage of the approach according to the invention is that conflicts in the process irregularity information provided by the individual process monitoring systems can be automatically resolved by an appropriate choice of weighting factors. Alternatively, one could also check further conditions, for example, whether two different process monitoring devices indicate a process irregularity for the same positions in a layer of an object, etc.

With the inventive approach it is possible to infer a poor part quality from a deficient process quality in the manufacture of a part. Here, it may also happen that during the manufacturing process there are certain layers in which the process quality is insufficient. This would have effects on all objects manufactured in a construction process that have object cross-sections in these layers. Therefore, in a modification of the invention before quality indicator values are determined, at first a layer grade indicator value $S_i$ per layer (thus independent from a specific object cross-section in the layer) is determined based on the second datasets 1020, e.g. by determining the averages of the relative frequencies of process irregularities over all object cross-sections or by averaging the grade indicator values $R_i$ assigned to the individual object cross-sections in one layer or else by choosing the worst grade indicator value $R_i$ as grade indicator value $S_i$ for a layer.

In a further modification of the approach described with reference to FIGS. 3 and 4, a relative frequency of process irregularities can be determined for a partial region of an object cross-section (partial object cross-section) in a layer instead of or in addition to the determination of a grade indicator value $R_i$ per object cross-section. Then, from the relative frequency of process irregularities for a partial region of an object cross-section in a layer a grade indicator value $R_j$ can be determined for this partial region. With such an approach it is possible to take into consideration only a partial region of an object cross-section predetermined in advance for the assessment of the part quality. Alternatively, within an object cross-section relative frequencies of process irregularities are detected for several partial regions of this object cross-section and a partial region grade indicator value $R_j$ is correspondingly assigned to each partial region. In this way it is possible to identify process defects at a very particular position in the manufacture of an object more systematically or else to consider only particularly critical positions for the assessment of the object quality. One could also downgrade a grade indicator value $R_i$ of an object cross-section, if a worse grade indicator value $R_j$ exists for the partial region. The mentioned partial region of an object cross-section can in particular be an exposure stripe or an exposed square, if an object cross-section is exposed stripe by stripe or square by square. In order to avoid any misunderstanding, it shall be pointed out that a stripe is not a line-shaped exposure as it occurs for example in a so-called "hatching".

In the above description of the inventive method and the inventive device of determining a quality indicator Q it is referred to the existence of first datasets and second datasets. Here, it shall be mentioned that of course the present invention is not limited to the situation that an above-defined first dataset 1010 at first is stored somewhere and an above-defined second dataset 1020 is explicitly stored at another location. The data of the first dataset 1010 and of the second dataset 1020 can also be information present in a volatile memory of a data processing equipment which information exists only as a short-term computing result and is immediately processed further. In particular, there need not exist a complete first dataset and second dataset somewhere in a memory, which dataset comprises information on all layers and objects. In principle it is sufficient, if only information on the process irregularities and grade indicator values at least for one layer and one object cross-section do temporarily exist (as a sort of intermediate result based on which the manufacturing process of the respective object or all objects can be (for example automatically) stopped, if necessary. However, the inventive method is of course easier manageable if reference is made to a first dataset 1010 existing in a memory and a second dataset 1020 existing in a memory.

In a second embodiment of the invention, the detection unit 1002 shown in FIG. 3 is not arranged in the device 1000 of determining a quality indicator Q, but is arranged in each of the process monitoring devices 101 shown in FIGS. 1 and 2. Also, the generation unit 1003 is arranged in each of the process monitoring devices 101 instead of the device 1000. However, the method described with reference to FIG. 4 does not necessarily change as a result thereof. Rather, each of the process monitoring devices 101 detects a grade indicator value $R_i$ per object cross-section and layer separately and generates itself a second dataset 1020 containing this information. Then, the provision unit 1001 in the device 1000 provides the corresponding second datasets from the process monitoring devices 101 to the quality indicator determination unit 1004. The quality indicator determination unit 1004 then determines a quality indicator value Q by using the number of second datasets 1020 as already described further above.

Optionally, a quality indicator determination unit 1004 can also be formed in a process monitoring device 101, for example also in each process monitoring device. In such a case, each process monitoring device 101 determines itself a single quality indicator EQ. As a result, it is possible to either dispense with a separate device 1000 for determining a quality indicator Q (the process monitoring device 101 in such case is itself a device of determining a quality indicator) or else a dedicated device 1000 determines a quality indicator value Q for one or several manufactured objects, preferably for each of the manufactured parts, based on the single quality indicator values EQ that were determined at first by the individual process monitoring devices 101. Again, when the quality indicator value Q is determined, the single quality indicator values EQ that were determined at first for the individual process monitoring devices may be attributed with weighting factors. In a modification it is also conceivable that a confidence indicator is determined which indicates whether the single quality indicators EQ of the individual process monitoring devices 101 are inconsistent with one another or are very similar to one another.

As can be seen based on the second embodiment, there exist different possibilities for an implementation of the device 1000 of determining a quality indicator Q. One recognizes that the components 1001, 1002, 1003, 1004 may also be distributed over several physical devices and that still the interacting components 1001, 1002, 1003, 1004 can be regarded as device 1000 of determining a quality indicator.

In the above-described embodiments and modifications of the same it is possible to have a user specifying one or more parameters of the method (for example via an input unit). For example, the weighting factors for a consideration of the irregularity information and grade indicator values, respectively, provided by the individual process monitoring devices can be specified by a user. Furthermore, also a grade indicator limit value Z can be specified (possibly separately for each process monitoring device). Furthermore, optionally also a graphic representation of the irregularity information assigned to the individual layers or alternatively a graphical representation of the grade indicator values $R_i$ assigned to the individual layers and object cross-sections can be implemented. A visualization of the irregularity information in dependence of the position within a layer may make it easier for a skilled person (in particular for a color representation) to quickly recognize the quality of a manufacturing process and the quality of the objects and to immediately recognize in a simple way whether for example problems occur in a specific region of the layers, which problems can possibly be attributed to problems in this region of the construction chamber, as the case may be.

Even if for the grade indicators or quality indicators up to now only ranges of values were mentioned that are subsets of the natural numbers (including zero, as the case may be), e.g. the numbers 1 to 6, 5 to 10, etc., the respective value ranges could also be other sets, e.g. letters, etc. provided that an order relation exists between the members of the corresponding set.

Even if in FIG. 1 a laser sintering or laser melting device was described as example of a layer-wise additive manufacturing device, the invention is not limited to laser sintering or laser melting. It can be applied in connection with any method of additively manufacturing a three-dimensional object by a layer-wise application and selective solidification of a building material. Only by way of example, laser melting, LLM (cutting out of laminations and assembling), FLM (application of a thermoplastic material from a nozzle), 3D printing, mask sintering methods and stereolithographic methods shall be mentioned here.

The exposure device may comprise for example one or more gas or solid-state lasers or any other type of laser such as laser diodes, in particular VCSEL (Vertical Cavity Surface Emitting Laser) or VECSEL (Vertical External Cavity Surface Emitting Laser) or a line of these lasers. In general, instead of a laser any device can be used by which energy can be selectively applied on a layer of the building material as wave or particle radiation. For example, another light source, an electron beam or any other energy or radiation source that is suited to solidify the building material can be used instead of a laser.

Finally, it shall be mentioned that the setup of a laser sintering or melting device shown in FIG. 1 is only by way of example and may of course be modified.

Various materials can be used as building material, preferably powder, in particular metal powder, plastic powder, ceramic powder, sand, filled or mixed powders or photopolymers.

Finally it shall be mentioned that a device 1000 of determining a quality indicator may be implemented either by software components alone or else by mixtures of hardware and software. In particular, interfaces mentioned in the present application do not necessarily need to be implemented as hardware components, but can also be implemented as software modules, for example, if the data fed in or output via them can be taken over from other components already implemented on the same device or have to be transferred to another component only by means of software. Furthermore, several interfaces can also be combined in a common interface such as an input-output interface. Furthermore, the device 1000 may be integrated into a control unit 29 of a layer-wise additive manufacturing device.

The invention claimed is:

1. A method of determining a quality indicator of an object that has been manufactured by a layer-wise additive manufacturing method, wherein in the layer-wise additive manufacturing method the object is manufactured layer by layer by a solidification of a building material at positions corresponding to cross-section of the object in a layer among a plurality of layers, wherein the method comprises at least the following steps:
   a step S1 of providing a first dataset that is assigned to a process monitoring device, wherein in the first dataset for several layers following upon one another during the course of the manufacture, a process irregularity information detected by the process monitoring device is assigned to each of a pre-defined number of solidified positions of the layer;
   a step S2 of detecting a relative frequency of occurrence of a process irregularity in the layer and of assigning a grade indicator value to the solidified object cross-section according to the detected relative frequency, wherein different grade indicator values indicating different quality levels are assigned to different ranges of values of the relative frequency;
   a step S3 of generating a second dataset, wherein a grade indicator value is assigned to the object cross-section in each of the layers; and
   a step S4 of determining a quality indicator by using the second dataset, the quality indicator indicating a quality of the manufactured object.

2. The method according to claim 1, wherein the layer-wise additive manufacturing method is a method in which a building material in powder form is solidified by a supply of heat to the positions corresponding to the cross-section of the object in the layer by selectively scanning the layer with energy radiation, and
   wherein the process irregularity information detected by the process monitoring device indicates whether a process irregularity occurred at a position of the layer when the position was scanned.

3. The method according to claim 1, wherein the relative frequency is detected by determining an area ratio of the positions of the object at which a process irregularity occurred in relation to a total area of the object cross-section.

4. The method according to claim 1, further comprising determining whether a position in a layer, to which position a process irregularity has been assigned, is located within a partial object cross-section and if so, determining the relative frequency of the occurrence of a process irregularity in relation to the partial object cross-section and assigning a partial grade indicator value to the partial object cross-section.

5. The method according to claim 3, further comprising determining whether a position in the layer, to which position a process irregularity has been assigned, is located within a partial object cross-section and if so, determining the relative frequency of the occurrence of a process irregularity in relation to the partial object cross-section and assigning a partial grade indicator value to the partial object cross-section; and
   replacing a grade indicator value assigned to the object cross-section in a layer by a grade indicator value indicating a lower value, if the partial grade indicator value assigned to the partial object cross-section indicates a lower quality than the grade indicator value assigned to the total object cross-section.

6. The method according to claim 1, further comprising determining a plurality of quality indicators for a corresponding plurality of objects that have been manufactured together by the layer-wise additive manufacturing method.

7. The method according to claim 6, wherein in step S2 a layer grade indicator value is assigned to all object cross-sections as the grade indicator value.

8. The method according to claim 1, wherein in step S1 a plurality of first datasets is provided, each of which is assigned to a process monitoring device, wherein in step S2 for each first dataset a grade indicator value is assigned to each of the object cross-sections, wherein in step S3 a plurality of second datasets is generated based on the assignments in step S2 and wherein in step S4 in order to determine a quality indicator for an object at first a single quality indicator value is determined and a quality indicator value is determined based on the single quality indicator values.

9. The method according to claim 1, wherein in step S1 a plurality of first datasets is provided, each of which is assigned to a process monitoring device, wherein in step S2 for each first dataset a grade indicator value is assigned to each of the object cross-sections, wherein in step S3 a plurality of second datasets is generated based on the assignments in step S2 and wherein in step S4 in order to determine a quality indicator for an object at first a total quality indicator value for an object cross-section in a layer is determined by assigning weighting factors to the individual grade indicator values assigned to an object cross-section, and then the quality indicator for the object is determined based on the determined total grade indicator values.

10. The method according to claim 1, further comprising replacing a grade indicator value or total grade indicator value assigned to an object cross-section in by a grade indicator value and a total grade indicator value, respectively, if a grade indicator value or total grade indicator value indicating a higher quality is assigned to the object cross-sections belonging to the object in at least n following layers, wherein n is a pre-defined natural number.

11. The method according to claim 1, further comprising determining whether the object has an acceptable quality by:
   setting a grade indicator limit value and comparing the grade indicator values and total grade indicator values, respectively, for the object cross-sections of each layer with the grade indicator limit value; and determining a quality of the object to be acceptable only if none of the grade indicator values and total grade indicator values, respectively, are assigned to a lower quality level than the grade indicator limit value.

12. The method according to claim 1, wherein the quality indicator is an element of a set of quality degree indexes, wherein a cardinality of the set is larger than one and there exists an order relation between members of the set.

13. A device for determining a quality indicator of an object that has been manufactured by a layer-wise additive manufacturing method, wherein in the layer-wise additive manufacturing method the object is manufactured layer by layer by a solidification of a building material at positions corresponding to the cross-section of the object in a layer among a plurality of layers, wherein the device comprises at least the following:
   a provision unit that provides a first dataset assigned to a process monitoring device, wherein the first dataset includes process irregularity information detected by the process monitoring device and assigned to each of a pre-defined number of solidified positions of the layer;
   a detection unit, which, when in operation, detects for the plurality of layers a relative frequency of occurrence of a process irregularity in a layer and assigns a grade indicator value to the solidified object cross-section in the layer according to the detected relative frequency;
   assigning to different ranges of values of the relative frequency different grade indicator values indicating different quality levels;
   a generation unit, which, when in operation, generates a second dataset, in which a grade indicator value is assigned to the object cross-section in each of the plurality of layers; and
   a determination unit for determining a quality indicator by using the second dataset, the quality indicator indicating a quality of the manufactured object.

14. A process monitoring device for detecting the occurrence of process irregularities in a layer-wise additive manufacturing method, wherein in the layer-wise additive manufacturing method the objects are manufactured layer by layer by a solidification of a building material at positions corresponding to a cross-section of an object in a layer among a plurality of layers, wherein the process monitoring device comprises a device according to claim 13 and further comprises:
   an irregularity detection unit, which, for each of a pre-defined number of positions of the layer that have been scanned with energy radiation, performs an irregularity detection of an occurrence of a process irregularity concerning at least one process parameter in the manufacture; and
   a process irregularity documentation unit that generates a first dataset, in which, for at least some of the plurality of layers, assigns process irregularity information to each of a pre-defined number of solidified positions of the layer that have been scanned with the energy radiation, the process irregularity information indicating whether a process irregularity occurred during the solidification of the building material.

15. The process monitoring device according to claim 14, wherein the irregularity detection unit is a layer monitoring unit and/or a photodiode-based melt pool monitoring device and/or an optical tomography unit.

16. A device for manufacturing at least one three-dimensional object a layer-wise additive manufacturing method, wherein in the layer-wise additive manufacturing method the objects are manufactured layer by layer by a solidification of a building material at positions corresponding to a cross-section of the object in a layer among a plurality of layers, the device comprising:
   a scanning unit for scanning positions of an applied layer of the building material that correspond to the cross-section of the object by an energy radiation in order to selectively solidify the building material; and
   a device according to claim 13.

17. A computer program that is loadable into a programmable control unit and/or device and that has program code the method according to claim 1 when the computer program is executed.

18. A device for manufacturing at least one three-dimensional object by a layer-wise additive manufacturing method, wherein in the layer-wise additive manufacturing method the objects are manufactured layer by layer by a solidification of a building material at positions corresponding to the cross-section of the object in a layer, the device comprising:
   a scanning unit for scanning positions of an applied layer of the building material that correspond to the cross-section of the object by energy radiation in order to selectively solidify the building material; and
   a process monitoring device according to claim 14.

19. The device according to claim 16, further comprising a process monitoring device for detecting an occurrence of process irregularities in a layer-wise additive manufacturing method, wherein in the layer-wise additive manufacturing method the objects are manufactured layer by layer by a solidification of a building material at the positions corresponding to the cross-section of an object in a layer, wherein the process monitoring device comprises:
   an irregularity detection unit, which, for each of a pre-defined number of positions of a layer that have been scanned with energy radiation, performs an irregularity detection of the occurrence of a process irregularity concerning at least one process parameter in the manufacture; and
   a process irregularity documentation unit that generates a first dataset, in which, for the plurality of layers, a process irregularity information is assigned to each of a pre-defined number of solidified positions that have been scanned with the energy radiation, the process irregularity information indicating whether at that position a process irregularity occurred during the solidification of the building material.

* * * * *

UNITED STATES PATENT AND TRADEMARK OFFICE
CERTIFICATE OF CORRECTION

PATENT NO. : 11,141,923 B2  
APPLICATION NO. : 16/317742  
DATED : October 12, 2021  
INVENTOR(S) : Robert Achim Domröse Page 1 of 1

It is certified that error appears in the above-identified patent and that said Letters Patent is hereby corrected as shown below:

On the Title Page

Left column, item (22): Change "PCT Filed: Jul. 7, 2017" to "PCT Filed: Jul. 11, 2017."

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*